(12) United States Patent
Watson et al.

(10) Patent No.: US 9,979,462 B2
(45) Date of Patent: May 22, 2018

(54) RESILIENT VIRTUAL GROUND RECEIVERS

(71) Applicant: LOCKHEED MARTIN CORPORATION, Bethesda, MD (US)

(72) Inventors: Timothy Douglas Watson, Englewood, CO (US); William Alexander Brown, III, Carmel, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days. days.

(21) Appl. No.: 15/594,511

(22) Filed: May 12, 2017

(65) Prior Publication Data

US 2017/0353228 A1    Dec. 7, 2017

Related U.S. Application Data

(60) Provisional application No. 62/345,672, filed on Jun. 3, 2016.

(51) Int. Cl.

| H04B 7/185 | (2006.01) |
| H04B 7/155 | (2006.01) |
| H04B 7/08 | (2006.01) |
| H04W 56/00 | (2009.01) |

(52) U.S. Cl.
CPC ....... H04B 7/15592 (2013.01); H04B 7/0825 (2013.01); H04B 7/0894 (2013.01); H04W 56/005 (2013.01)

(58) Field of Classification Search
CPC .......................... H04B 7/0825; H04B 7/0894; H04B 7/15592; H04W 56/005

USPC ...... 455/12.1, 427, 3.2, 13.1, 455, 457, 517, 455/456, 410, 432, 509, 422, 435, 445, 455/565, 29; 370/206, 486, 543, 235, 370/241, 326, 468; 701/2; 342/357; 702/104

See application file for complete search history.

(56) References Cited

U.S. PATENT DOCUMENTS

| 5,619,528 A * | 4/1997 | Rebec | H04B 7/18517 348/14.08 |
| 5,844,636 A * | 12/1998 | Joseph | H04N 9/8042 348/E5.007 |
| 5,923,642 A * | 7/1999 | Young | H04B 7/18513 348/E7.093 |
| 6,043,788 A * | 3/2000 | Seavey | H01Q 3/20 343/765 |
| 6,201,798 B1 * | 3/2001 | Campanella | H04B 7/18526 370/326 |

(Continued)

Primary Examiner — Tan H Trinh
(74) Attorney, Agent, or Firm — McDermott Will & Emery LLP

(57) ABSTRACT

An apparatus includes a storage device configured to store location information of multiple receivers and auxiliary data associated with a space vehicle. A motion compensation block configured to correct timing of a received signal by a receiver from a space-vehicle transmitter and to generate a motion-compensated signal having corrected timing for motions of the space-vehicle transmitter. The corrected timing is determined based on stored location information of the receiver and the auxiliary data. The frequency correction block is configured to correct a carrier frequency of the motion-compensated signal using information associated with a synch channel of the received signal and to generate a processed signal.

20 Claims, 14 Drawing Sheets

(56) References Cited

U.S. PATENT DOCUMENTS

| | | | | |
|---|---|---|---|---|
| 6,272,316 | B1* | 8/2001 | Wiedeman | H04B 7/185 |
| | | | | 455/12.1 |
| 6,424,831 | B1* | 7/2002 | Schiff | H04B 7/18567 |
| | | | | 455/12.1 |
| 6,539,200 | B1* | 3/2003 | Schiff | H04B 7/1855 |
| | | | | 455/12.1 |
| 6,567,668 | B1* | 5/2003 | Valentine | H04B 7/18556 |
| | | | | 455/410 |
| 8,751,064 | B2 | 6/2014 | Ploschnitznig | |
| 9,755,732 | B1* | 9/2017 | Caudill | H04B 7/18582 |
| 2003/0074463 | A1* | 4/2003 | Swartz | H04L 29/06 |
| | | | | 709/230 |
| 2003/0201935 | A1* | 10/2003 | King | G01S 19/256 |
| | | | | 342/357.62 |
| 2003/0203717 | A1* | 10/2003 | Chuprun | G06K 13/0825 |
| | | | | 455/12.1 |
| 2007/0216573 | A1* | 9/2007 | Handermann | G01S 5/0027 |
| | | | | 342/357.22 |
| 2007/0259619 | A1* | 11/2007 | Beadle | H04B 7/18513 |
| | | | | 455/12.1 |
| 2013/0241775 | A1* | 9/2013 | Naden | H04B 1/707 |
| | | | | 342/450 |
| 2013/0286833 | A1* | 10/2013 | Torres | H04L 69/24 |
| | | | | 370/235 |
| 2014/0336973 | A1* | 11/2014 | Froggatt | G01B 9/02004 |
| | | | | 702/104 |
| 2017/0248701 | A1* | 8/2017 | Adler | G01S 19/17 |
| 2017/0324470 | A1* | 11/2017 | Roos | H04B 7/2041 |

\* cited by examiner

RESILIENT VIRTUAL GROUND RECEIVERS

CROSS-REFERENCE TO RELATED APPLICATIONS

This application claims the benefit of priority under 35 U.S.C. § 119 from U.S. Provisional Patent Application 62/345,672 filed Jun. 3, 2016, which is incorporated herein by reference in its entirety

STATEMENT REGARDING FEDERALLY SPONSORED RESEARCH OR DEVELOPMENT

Not applicable

FIELD OF THE INVENTION

The present invention generally relates to satellite communications, and more particularly, to resilient virtual ground receivers.

BACKGROUND

Space-based systems may work with ground stations for communication of command and control, telemetry, and mission data. Often times there are multiple ground stations used as part of the same system to provide increased access or contact time. These ground stations are typically self-contained, meaning that each station independently closes the communications link. Resilient virtual ground (RVG) is a network of receivers that may be used to increase the channel capacity of space-to-ground communications links. An RVG system may leverage the proliferation of terrestrial mobile infrastructure, broadband access and cloud computing to decrease cost of deployment and implementation. Within an RVG system, receivers are distributed across a deployment area. Within the deployment area receivers may be tuned to the same radio frequency (RF) band and multiple receivers may be simultaneously in the satellite transmit beam. The RVG increases channel capacity by coherent combination of the receivers that are simultaneously in the satellite transmit beam. A single RVG receiver may not need to close the communications link with the satellite. Receiver locations are spatially diverse so that RVG is inherently resilient and difficult to jam.

Terrestrial communication service towers (e.g., mobile towers) are excellent potential site locations due to their spatial distribution and existing infrastructure which includes power and connectivity to the internet. Communications service tower sites will often lease tower space and resources. It is envisioned that an RVG system would proliferate low cost radios wherever available infrastructure exists. The notion of ground site link, contact, and availability within an RVG is different than with a traditional satellite ground station.

SUMMARY

According to various aspects of the subject technology, methods and configuration for utilizing multiple spatially diverse receivers are provided. In some aspects, the multiple spatially diverse receivers are all networked together to achieve redundancy, a desired channel capacity, and resilience. The increase in channel capacity may be used to increase data throughput or to decrease satellite transmit power or to decrease the receiver antenna gain.

In some other aspects, an apparatus includes a storage device configured to store location information of multiple receivers and auxiliary data associated with a space vehicle. A motion compensation block is configured to correct timing of a received signal by a receiver from a space-vehicle transmitter and to generate a motion-compensated signal having corrected timing for motions of the space-vehicle transmitter. The corrected timing is determined based on stored location information of the receiver and the auxiliary data. The frequency correction block is configured to correct a carrier frequency of the motion-compensated signal and to generate a processed signal. The frequency correction may be accomplished using information associated with a synch channel of the received signal.

In other aspects, a method for utilizing multiple spatially diverse receivers include storing location information of multiple receivers and auxiliary data associated with a space vehicle in a storage device. Timing of a signal received by a receiver is corrected based on stored location information of the receiver and the auxiliary data and is used for generating a motion-compensated signal having corrected timing for motions of a space-vehicle transmitter. A carrier frequency of the motion-compensated signal may be corrected using information associated with a synch channel of the signal including training sequence and training sequence detection information and is used for generating a frequency-corrected signal.

In yet other aspects, a satellite communication system includes a satellite transmitter that may be configured to transmit accumulated data, one or more ground receivers, each receiver configured to receive a raw data from the satellite transmitter and organize the raw data. The raw data includes the accumulated data. One or more combiner nodes are in communication with the receivers over a network. A network controller is configured to coordinate operation of the satellite transmitter and the receivers. A storage device is configured to store location information of the receivers and auxiliary data associated with the satellite transmitter. A motion compensation unit is configured to correct timing of the organized raw data and to generate motion-compensated signal having corrected timing for motions of the satellite transmitter. The corrected timing is determined based on stored location information of the receiver and the auxiliary data. A frequency correction unit is configured to correct a carrier frequency of the motion-compensated signal using information associated with a synch channel of the received signal and to generate a processed signal. A signal combiner is configured to coherently combine a plurality of processed signals using information associated with a synch channel of the received signal and to generate a combined processed signal. The signal strength is increased by the signal combiner with the amount of gain directly related to the number of signal inputs.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

Figure 1:
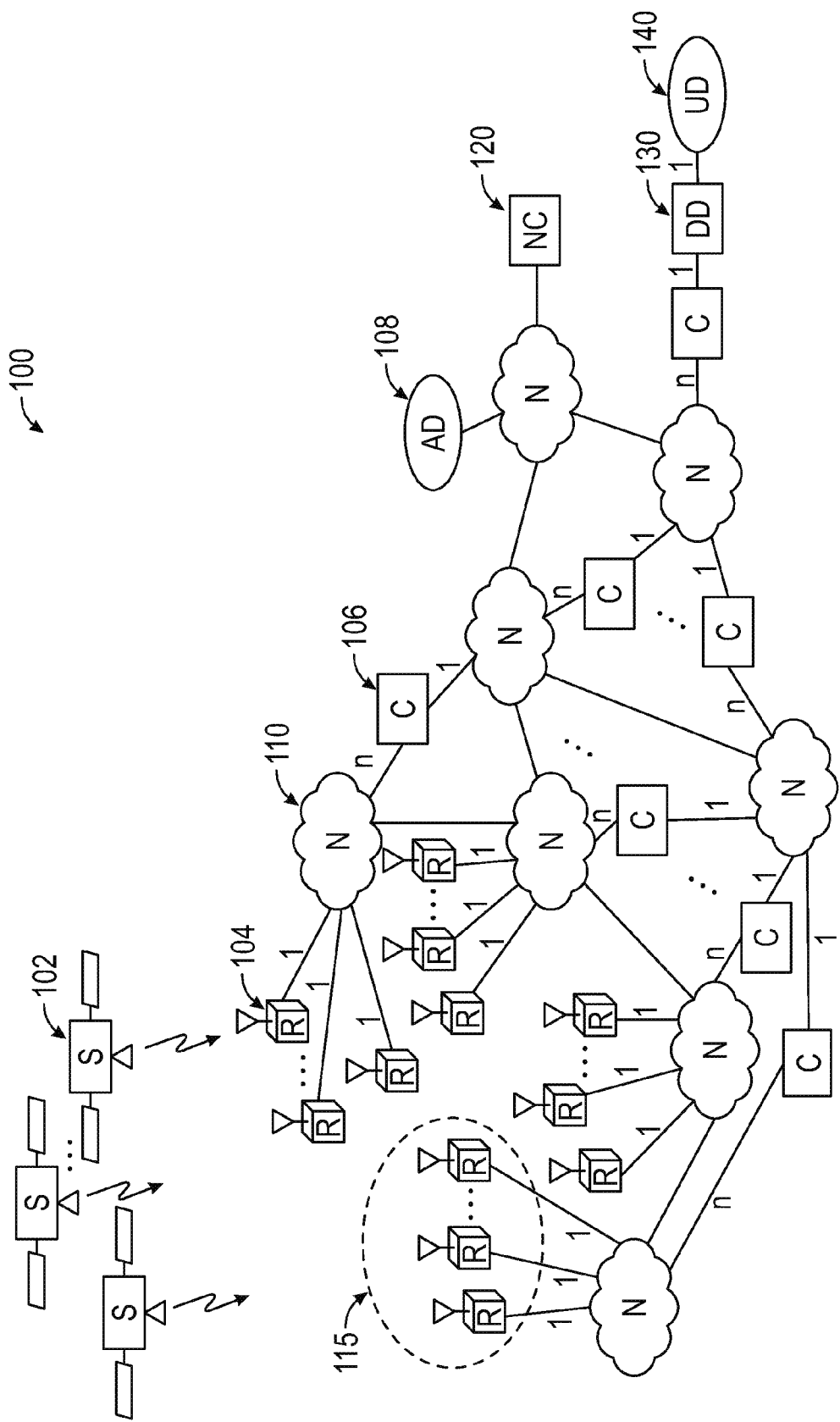
FIG. 1 is a high-level diagram illustrating an example of a resilient virtual ground (RVG) system, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to systems and configurations for utilizing multiple spatially diverse ground receivers that are all networked together to achieve redundancy, a desired channel capacity, and resilience at a lower satellite transmit power. In some aspects, the number of receivers in the instantaneous footprint of the satellite is M*N, where N is the number of receivers tuned to the same sub-band and M is the number of sub-bands. The system exploits redundancy within a sub-band through coherent signal combining that increases fundamental channel capacity. Increasing the fundamental channel capacity (e.g., Shannon capacity) allows users of the system to trade between satellite power/antenna gain and data rate so as to address the existing problems such as congested and contested available federal communications commission (FCC)/international telecommunication union (ITU) bands and transmit power requirements for communications systems that drive spacecraft cost.

The system of the subject technology includes features including spatial diversity and quantity of receivers that address the system failure issues. The disclosed system configuration, for example, the arrangement of the geographic locations of receivers and the way data is routed and integrated, degree of receive node redundancy, redundancy in the transmitted data, and other implementation details provide flexibility on system resiliency and data throughput. Examples of the other implementation details include network protocol, equipment anti-tamper, network, and data path redundancy.

The disclosed solution is better than existing solutions because of its inherent resilient properties, flexibility to address different mission needs, and scalability. The subject disclosure allows for an inexpensive receiver technology to be utilized at each ground node by receiving the transmission band in relatively narrow instantaneous bandwidths, which are then combined to reconstruct the complete transmission band. The subject technology, not only works with existing modulation techniques, it can enable higher order modulation techniques to be used. Using the subject technology, carrier-to-interference and carrier-to-noise can be driven down to levels that would not interfere with existing geostationary satellite orbit (GSO) receive earth stations, thereby opening up new spectrum for mission data downlink.

FIG. 1 is a high-level diagram illustrating an example of a resilient virtual ground (RVG) system 100, according to certain aspects of the disclosure. The RVG system 100 includes a number of space vehicles (e.g., satellites) 102, receivers 104 (e.g., ground receivers), combining processors 106 (e.g., coherent combining processors, also referred to as "combiner nodes"), auxiliary data (AD) sources 108, network controllers (NCs) 120, data demodulators (DDs) 130, user data (UD) 140, which are coupled to one another via network 110. The space vehicles 102, for example, satellites may collect various terrestrial data (e.g., images), such as meteorological, environmental, geological, geographical, and other data of interest of a variety users such as organizations, companies, research centers, universities and other interested entities. The space vehicles 102 add (e.g., inject) RVG synch-channel (e.g., including training bits) into the collected data and transmit the collected data and the synch-channel to a number of receivers 104. The received data by multiple receivers may be combined coherently, using the synch-channel information, to recover user data 140.

In some aspects, the space vehicles 102 may transmit the collected data the receivers 104, individually or to groups of receivers 115. The collected data may be transmitted to different receivers 104 or groups of receivers 115 in sub-bands (e.g., a portion such as about 0.5-1 MHz of a full bandwidth of about 40-60 MHz). In some aspects, each receiver 104 or each group of receivers 115 can receive the collected data in the entire bandwidth, depending on the bandwidth and the capabilities of the receiver 104 or the group of receivers 115. The receivers 104 may be coupled to each other or to groups of receivers 115 via the network 110. The network 110 can be the Internet. In some aspects, the network 110 is not limited to the Internet and can be a backhaul wireless or wired network such as any of a personal area network (PAN), a local area network (LAN), a campus area network (CAN), a metropolitan area network (MAN), a wide area network (WAN), a broadband network (BBN), and the like. Further, the network 110 can include, but is not limited to, any one or more of the following network topologies, including a bus network, a star network, a ring network, a mesh network, a star-bus network, tree or hierarchical network, and the like.

The combining processors 106, as described in more details herein, can coherently combine multiple data received from a number of receivers 104 or groups of receivers 115 and can generate a single coherent superposition of the multiple received data. The superposition of the multiple received data can then be demodulated in data demodulator 130 to be converted in a format usable by user as the user data 140. In some aspects, the data received by each combining processors 106 may be a single-source data stream (denoted as "1") or a multiple-source data stream (denoted as "n"), for example, n-source data stream associated with n different sources (e.g. receivers 104), communicated over the network 110.

Auxiliary data 108 includes satellite orbit parameters, synchronization, and training signal characteristics assigned to the satellites. In some aspects, the network controller 120 coordinates operation of the receivers 104 and/or the receiver groups 115 and the combining processors 106. For example, satellite orbit parameters of satellites 102 are obtained from auxiliary data source 108 and are used to model the satellite position and velocity versus time (e.g., ephemeris), which can be used to plan operations of operation of the receivers 104 and/or the receiver groups 115 and the combining processors 106. Further, the network controller 120 assesses health and status reports from the receivers 104 and/or the receiver groups 115 and factors data from these reports in scheduling of the receivers 104 and/or the receiver groups 115. In some aspects, receiver sites (e.g., 104 of FIG. 1) can leverage existing infrastructure (e.g. mobile telecommunication antenna towers) that already have the necessary power, equipment bays, antenna mounting structures, and redundant broadband connectivity. These potential sites have the right spatial diversity and scale to accommodate the system.

In some aspects, the network controller 120 coordinates transmission and/or receive times, sub-band tuning, data routing, and the processing application servers that would coherently combine sub-bands and produce the fully demodulated data stream. The coherent combining performed by the combining processor 106 can be utilized to decrease transmit power and antenna sizes of the satellite 102. Further architecture details of the satellite transmitters are discussed with respect to FIGS. 2A-2B below.

Figure 2A:
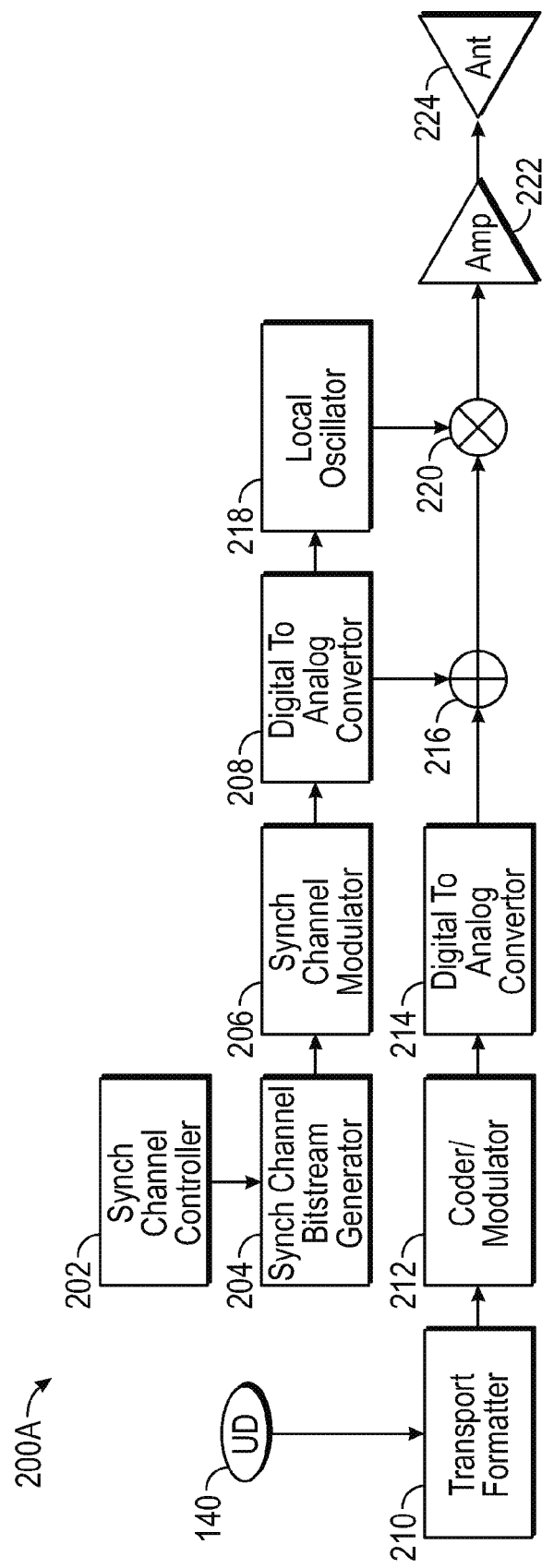
FIGS. 2A-2B are block diagrams illustrating example system architecture for a satellite transmitter, according to certain aspects of the disclosure.
Figure 2B:
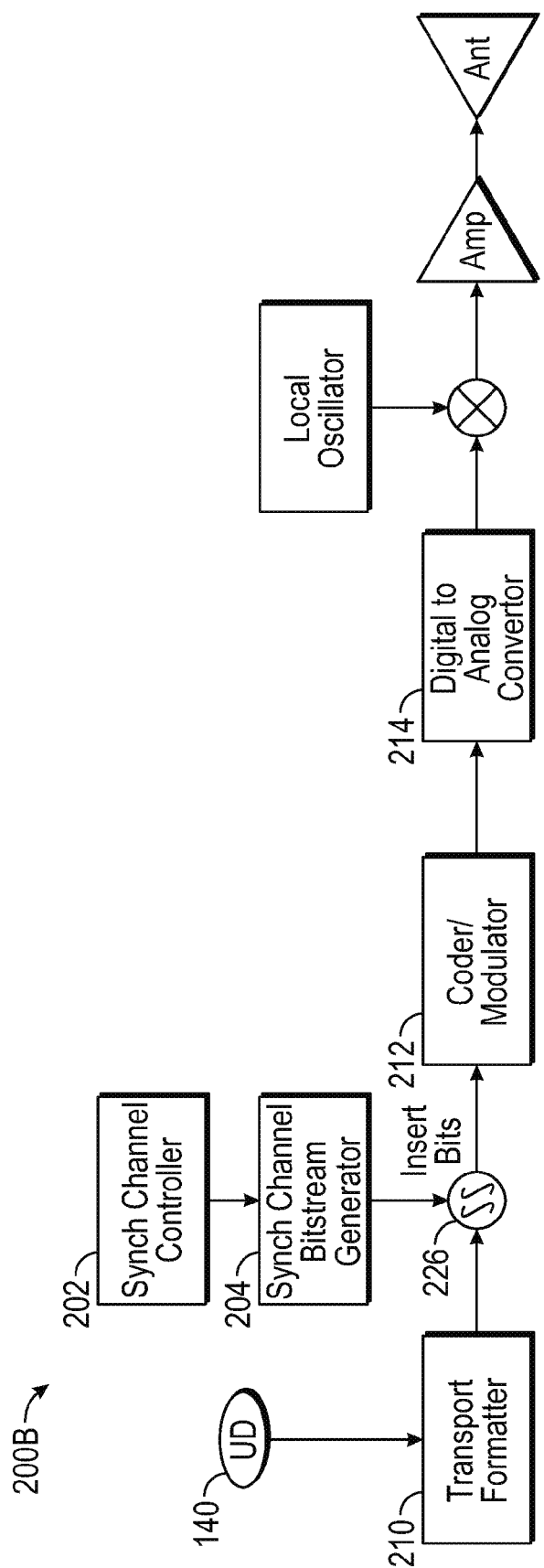

FIGS. 2A-2B are block diagrams illustrating example system architecture for satellite transmitters 200A and 200B, according to certain aspects of the disclosure. In the system architectures 200A and 200B RVG synch-channel and underlying training bits are incorporated in the collected user data. According to the transmitter architecture 200A, a satellite transmitter includes a synch-channel controller 202, a synch-channel bitstream generator 204, a synch-channel modulator 206, a digital-to-analog converter (DAC) 208, a transport formatter 210, a coder/modulator 212, a DAC 214, a local oscillator (LO) generator 218, a mixer 220, an amplifier 222, and an antenna 224 (e.g., a radio-frequency (RF) antenna). The transmitter architecture 200A incorporates the RVG synch-channel information that is independent of the user data transport layer format, and modulation and coding. Formation of the synch-channel is accomplished through a separate signal formation chain and then added via the mixer 220.

In some aspects, the transport formatter 210 receives user data 140 collected by the satellite 102 of FIG. 1, which may be retrieved from a satellite database, and make format changes to the received data to prepare it for processing by the coder/modulator 212. The coder/modulator 212 provides baseband encoding and modulation of the data received from the transport formatter 210, according to the known methods. The encoded and modulated baseband signal from the coder/modulator 212 is a digital signal and is converted to analog baseband signal by the DAC 214. The analog baseband signal of the DAC 214 is passed to the analog combiner 216, for mixing with the synch-channel information, as described herein.

The synch-channel controller 202 generally provides control parameters to the functional elements that generate the synch-channel waveform, for example, the synch-channel bitstream generator (SCBSG) 204 and synch-channel modulator 206. In some aspects, the control parameters are either static or are dynamically updated by the network controller 120 via a separate command and control link managed by the space vehicle 102 of FIG. 1. The parameters may include a modulation type, a symbol rate, a finite-length bit sequence associated with the space vehicle 102 that produces an integer number of symbols, a sequence repetition period (e.g., ≥ than the bit sequence duration, and also an integer number of symbol periods). Example parameter values include modulation type BPSK, symbol rate of about $1.023 \times 10^6$ symbols per second, training bit sequence, for example, equal to the Gold Code corresponding to the known GPS C/A code for SV ID1 code and sequence repetition period of about $1023/1.023 \times 10^6$ seconds. It is understood that diversity of motion between the space vehicle 102 may degrade low cross-correlation properties of orthogonal or near-orthogonal codes.

The SCBSG 204 receives finite-length bit sequence associated with the space vehicle 102 and sequence repetition period from the synch-channel modulator 206 and produces a bitstream that can be referred to as a training bit sequence. The generated bitstream is then sent to the synch-channel modulator 206. The synch-channel modulator 206 receives symbol period and modulation-type parameters from the synch-channel modulator 206 and a bitstream from the SCBSG 204. The synch-channel modulator 206 produces a modulated digital waveform that is converted to an analog synch-channel signal via the DAC 208 and is passed to the signal combiner 216 to be combined with the analog baseband signal of the DAC 214. The combined analog baseband signal and synch-channel signal are then up-converted by the mixer 220, using the (LO signal generated by the LO generator 218, using known methods. The up-converted signal is then suitably amplified by the amplifier 222 and transmitted via the antenna 224, for example, to ground receivers 104 and/or groups of ground receivers 115 of FIG. 1.

In the embodiment represented by the transmitter architecture 200B, the RVG synch channel is incorporated in an alternative method that can work without the additional signal chain hardware or functionality for converting the synch channel bitstream to analog form.

The transmitter architecture 200B is similar to the transmitter architecture 200A, except for features further described herein. In the transmitter architecture 200B, the synch-channel modulator 206 and the digital-to-analog converter (DAC) 208 are not used. The digital signal of the transport formatter 210 is digitally combined, using known methods by the digital combiner 226, with the training bit sequence generated by the SCBSG 204. The combined digital signals is then processed by the coder/modulator 212 and converted to an analog baseband and synch-channel signal by the DAC 214. The analog baseband and synch-channel signal in then unconverted, amplified and transmitted as discussed above.

This embodiment of the transmitter architecture 200B is applicable to user data communication signal formation chains that can accommodate insertion of the synch channel training bits of a length and periodicity that satisfies RVG network detection criteria. For example, user data communication signal formation chains that utilize the known European telecommunications standards institute (ETSI) digital video broadcasting (DVB) second generation standard and implement the dummy physical layer (PL) frame insertion feature are compatible with the embodiment of the transmitter architecture 200B.

Figure 3A:
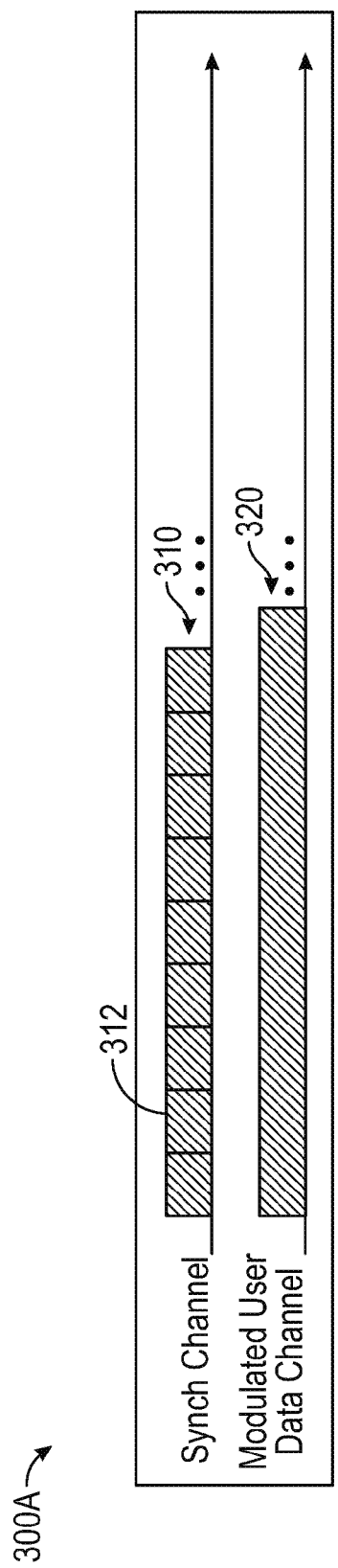
FIGS. 3A-3C are time diagrams illustrating synch-channel and modulated user data channel, according to certain aspects of the disclosure.
Figure 3B:
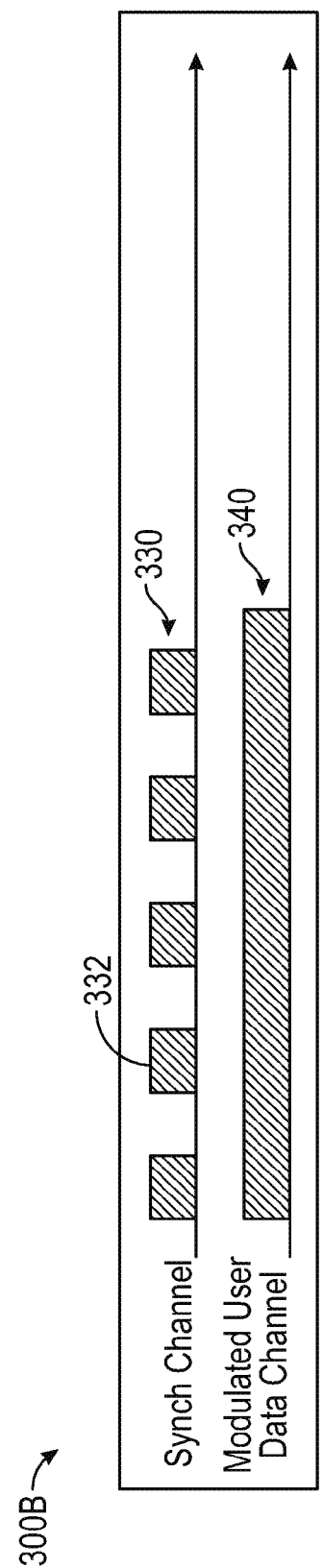
Figure 3C:
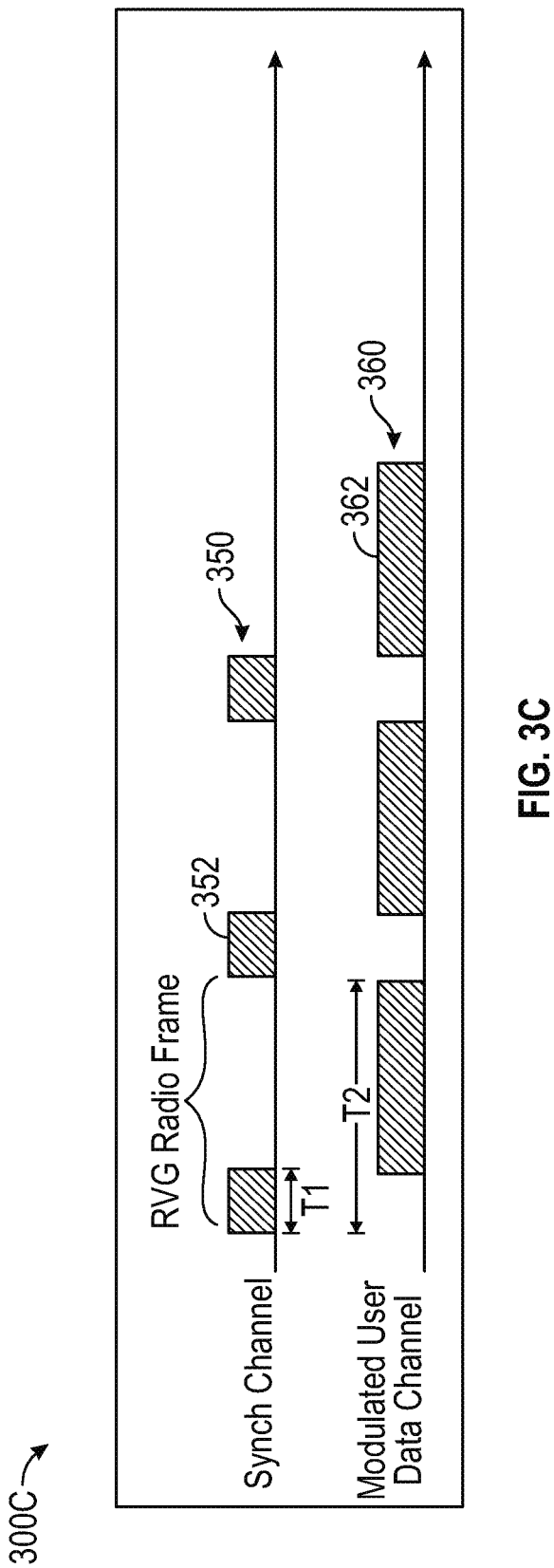

FIGS. 3A through 3C are time diagrams 300A-300C illustrating synch-channel and modulated user data channel, according to certain aspects of the disclosure. The synch channel 310 of time diagram 300A includes training bit sequences 312 with training bit sequence duration (T1) equal to the training bit sequence repetition period (T2). The modulated user data channel 320 includes user data that is part of a payload of an RVG radio frame. The RVG radio frame includes a training portion including one or more training bit sequences 312 and the payload including the user data. The synch channel 330 of time diagram 300B includes training bit sequences 332 with training bit sequence duration (T1) smaller than the training bit sequence repetition period (T2). The modulated user data channel 340 includes user data that is part of the payload of a respective RVG radio frame. The synch channels 310 and 330 and the modulated user data channels 320 and 340 are usable with the embodiment of the transmitter architecture 200A of FIG. 2A, as the synch channels and the modulated user data in this embodiments are separately processed and converted to analog signals.

The synch channel 350 of time diagram 300C includes training bit sequences 352 with training bit sequence duration (T1) smaller than the training bit sequence repetition period (T2). The training bit sequence repetition period T2 in the synch channel 350 is the same as an RVG radio frame length, which also includes a payload (user data) 362. The synch channel 350 and the modulated user data channels 360 are usable with the embodiment of the transmitter architecture 200B of FIG. 2B, as the synch channels and the modulated user data in this embodiments are combined digitally and then processed and converted to analog signals.

For the satellite transmitter 200A of FIG. 2A, the RVG radio frame is defined as one synch channel repetition period T2 of FIG. 3C. For the satellite transmitter 200B of FIG. 2B, the RVG radio frame is defined as a synch channel segment concatenated with a payload waveform segment 362 of FIG. 3C. The synch channel enables the use of efficient methods for obtaining the time and frequency synchronization needed to perform coherent combining of a large number of channels.

Figure 4A:
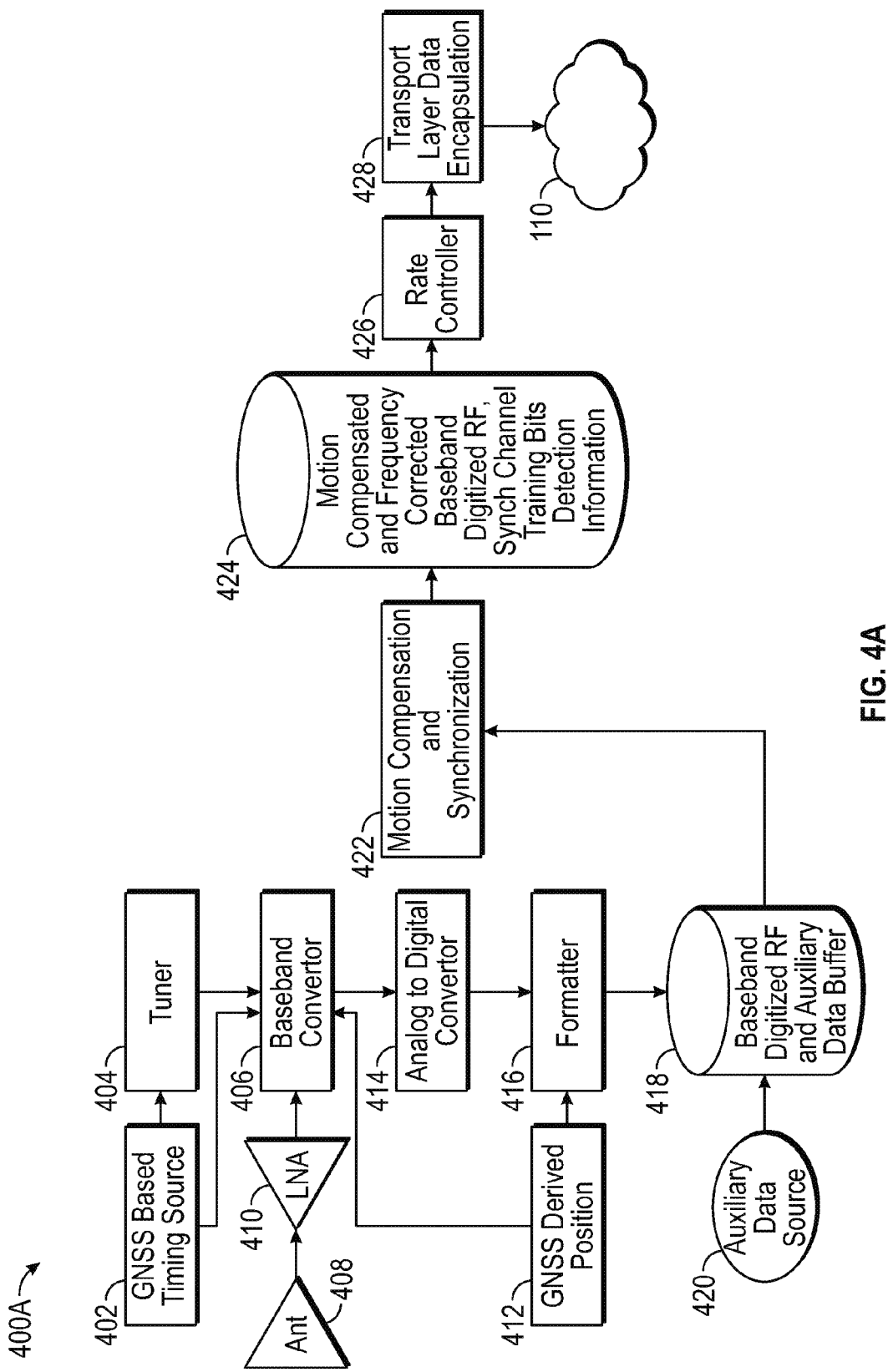
FIGS. 4A-4C are block diagrams illustrating example system architectures for a satellite receiver, according to certain aspects of the disclosure.
Figure 4B:
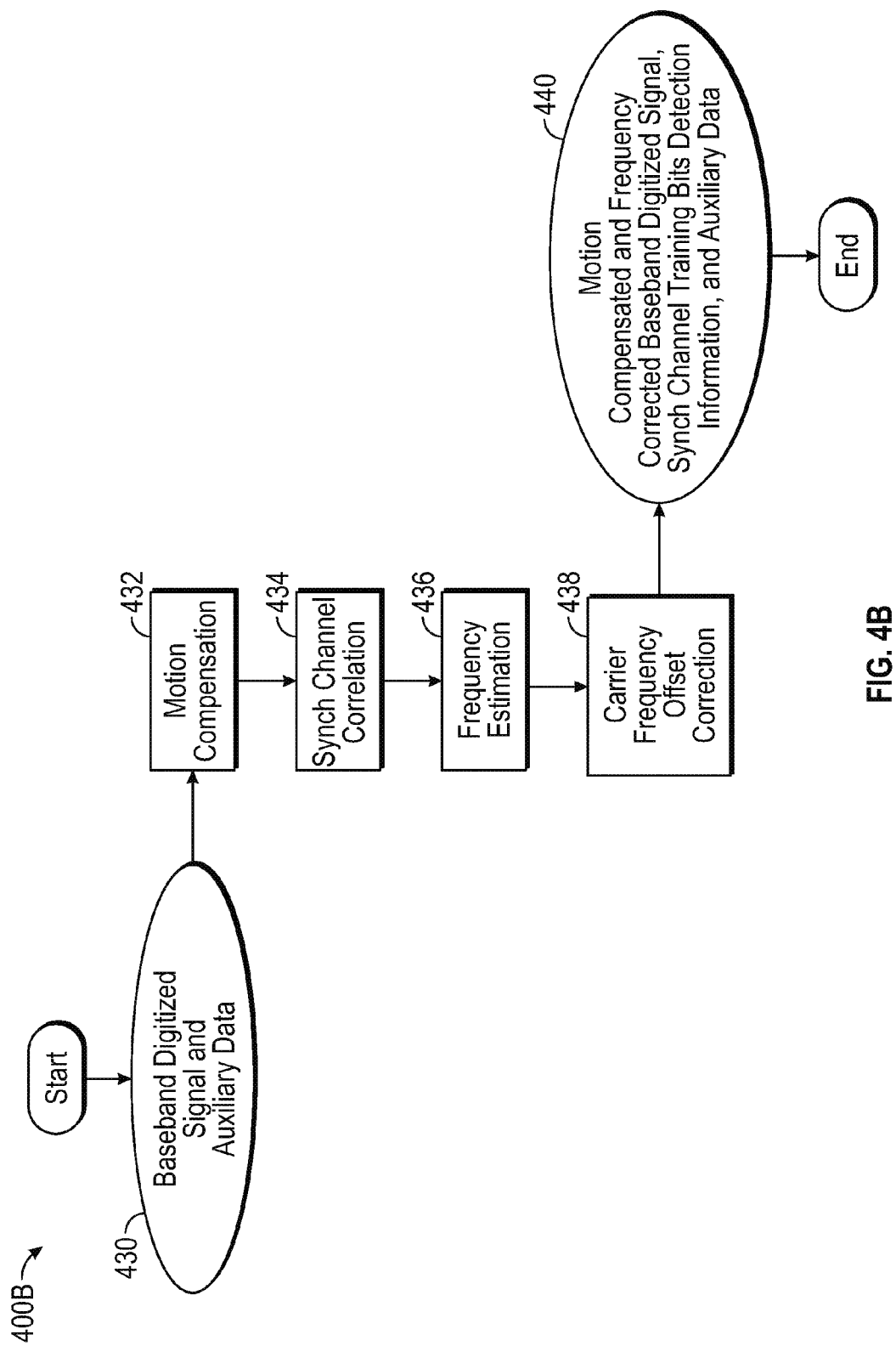
Figure 4C:
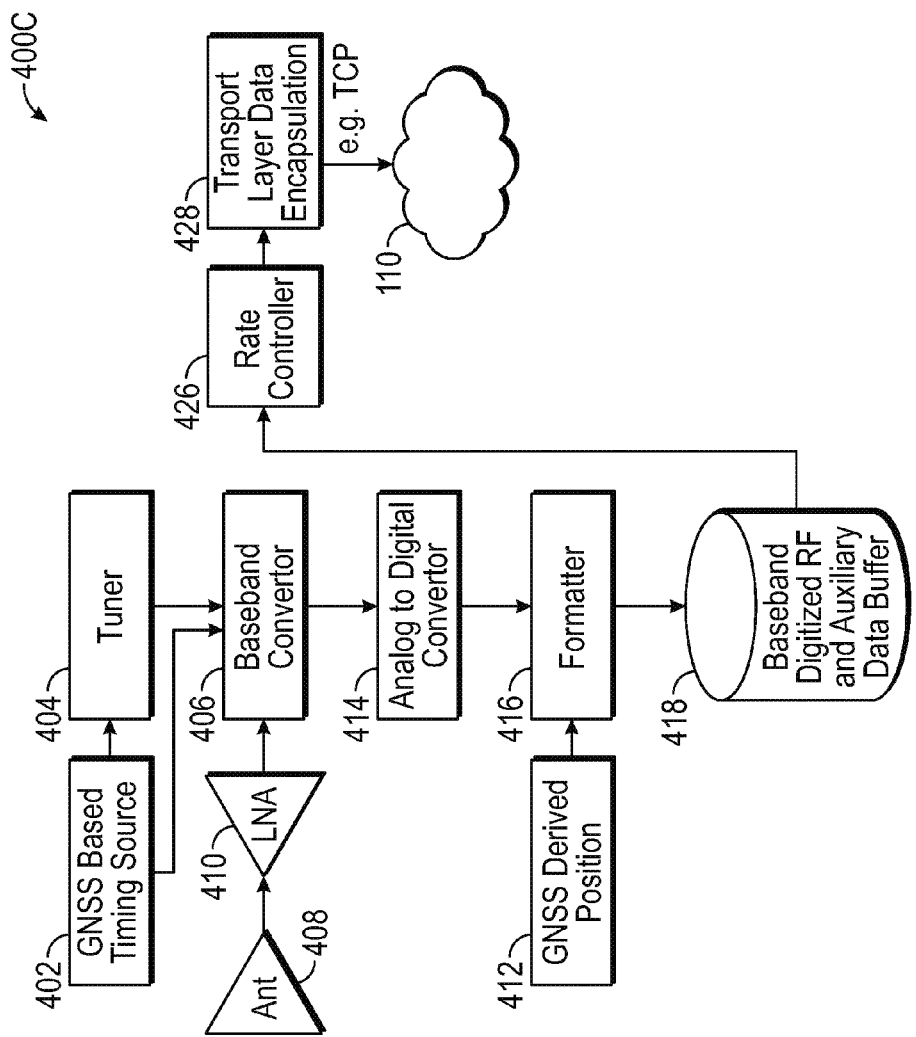

FIGS. 4A-4C are block diagrams illustrating example system architectures for satellite receivers 400A and 400C, according to certain aspects of the disclosure. The satellite receivers 400A and 400C generally digitize the RF channel that the satellites are transmitting and stream the data to combining processors (e.g. 106 of FIG. 1) over an existing communications link (e.g., the network 110). The satellite receiver 400A of FIG. 4A (e.g., an RVG receiver) is an example implementation of the receivers (e.g., ground receivers) 104 of FIG. 1. The satellite receiver 400A includes a global navigation satellite system (GNSS)-based timing source 402, a tuner 404, a baseband converter 406, a receive antenna 408, a low-noise-amplifier (LNA) 410, an analog-to-digital converter (ADC) 414, a formatter 416, a data buffer 418, an auxiliary data source 420, a motion compensation and synchronization block 422, a database 424, a rate controller 426, and a transport layer data encapsulation block 428 coupled to the network 110. The GNSS-based timing source 402 provides timing information necessary for motion compensation as discussed below.

The tuner 404 provides an LO signal that is tuned with the LO signal of the transmitter (e.g., 218 of FIG. 2A). Antenna 408 receives RVG radio signal which is suitably amplified and filtered, in some embodiments, by the LNA 410 and converted to a baseband signal by the baseband converter 406 using the LO signal generated by the tuner 404. In the baseband converter 406, the timing information generated by the GNSS-based timing source is utilized to drive local clocks and oscillators to provide precise timestamps of the ADC samples. Further, the GNSS derived position 412 of the RVG receiver 400A is utilized in the motion compensation process. The analog baseband signal is then converted to a digital baseband signal by the ADC 414. Next, the digital baseband signal is formatter by the formatter 416. The formatter 416 can packetize the digital baseband signal into a format that can accommodate the auxiliary data, including timestamps, and transport of the packets over a network (e.g., network 110). An example of this formatting operation is the known VersaModular Eurocard (VME) bus international trade Association (VITA) 49 radio transport standard.

The packetized digital baseband signal and auxiliary data from the auxiliary data source 420 are stored in the data buffer 418. The data buffer 418 can be any storage medium such as random access memory (RAM) or any other type of memory. The data from the data buffer is accessible to the motion compensation and synchronization block 422, the detail of which is discussed with respect to FIG. 4B below. The motion compensated and frequency corrected data is stored in the database 424. In some embodiments, the rate controller 426 can sample the baseband signal at a rate greater than or equal to the Nyquist rate for the bandwidth of the targeted communications signal. The rate controller 426 may perform rate control of the data being sent the subsequent transport layer data encapsulation block 428 to increase the efficiency of network utilization and satisfy network bandwidth limitations. The encapsulated data from the transport layer data encapsulation block 428 is made compatible with the transport layer protocol (TCP) and is streamed through the network 110 to a combining processor (e.g. 106 of FIG. 1). The functionality of the motion compensation and synchronization block 422 is discussed with respect to FIG. 4B below. In some aspects, the motion compensation and synchronization block 422 is implemented in hardware or firmware and may include a motion compensation block or unit and a frequency correction block or unit.

FIG. 4B show a flow diagram 400B of the motion compensation and synchronization block 422, which performs the time alignment and frequency correction functions. In some embodiments, the functionalities of the motion compensation and synchronization block 422 may be performed by a processor, such as a general processor, a graphic processor, a microcontroller, or other types of processor. At a motion compensation stage 432, the baseband digitized signal and auxiliary data 430 accessed from the data buffer 418 is used to perform motion compensation. At the motion compensation stage 432 the time-variable delay and phase effects due to propagation delay between the space vehicle and the receiver are reversed, as shown and discussed further with respect to FIG. 6 below. The reversal of the time-variable delay and phase effects removes dilation, contraction, and Doppler effects to enable coherent combining of signals from widely-spaced receivers (e.g., 104 of FIG. 1). To accomplish this, accurate space vehicle ephemeris and accurate geographic coordinates of the receiver antenna content of the auxiliary data are used. The output of the motion compensation stage 432 is an approximate replica of the baseband transmitted waveform, plus noise and interference.

In a synch channel correlation stage 434, the presence of the synch channel is detected and the time-of-arrival and coarse residual frequency offset, for each sequence repetition period of the synch channel (e.g., T2 of FIG. 3) is measured. This can be accomplished by cross correlation of the motion compensated data with delayed and frequency-shifted versions of the locally generated synch channel, for a predetermined range of delay uncertainty and frequency uncertainty. If the peak cross correlation is sufficiently strong, then the synch channel is detected, and the corresponding delay and frequency offset are measured. The strength of the detection and delay and frequency measurements are reported to the network controller (e.g., 120 of FIG. 1). The output of the synch channel correlation stage 434 includes the start time of the synch channel bit sequence, and a time-aligned and coarse-frequency corrected version of the motion compensated received data.

In a frequency estimation stage 436, the remaining frequency offset is measured with a desired resolution using more-than-one synch channel repetition period (e.g., T2 of FIG. 3). The accuracy of the frequency measurement is significantly finer than the reciprocal of the synch channel repetition period. This enables final frequency correction of the motion compensated waveform such that the accumulated carrier phase change over a synch channel repetition period is sufficiently small to enable coherent combination with negligible combined signal gain loss. For example, for binary phase-shift keying (BPSK) modulated signals, a carrier phase change of less than 10 degrees may be sufficient. The output of the frequency estimation stage 436 is the estimated carrier frequency residual for each synch channel repetition period.

In a carrier frequency offset correction stage 438, the carrier frequency offset of the time-aligned motion compensated data is removed for each synch channel repetition period. This is accomplished by multiplying an envelope of the complex data by the appropriate complex exponential time function. The output 440 of the carrier frequency offset correction stage 438 is a motion-compensated and frequency-corrected baseband digitized signal, synch channel training sequence (bits) detection information, and auxiliary data, which is stored in the database 424 of FIG. 4A.

The embodiment of the RVG receiver represented by the satellite receiver 400C of FIG. 4C sends raw digital samples to a combining processor (e.g., 106 of FIG. 1) that performs the time alignment and frequency correction. Unlike the output of the satellite receiver 400A of FIG. 4A, the raw digital samples are not motion-compensated, synch-channel corrected, or carrier frequency corrected. The satellite receiver 400C is similar to the satellite receiver 400A of FIG. 4A, except that the satellite receiver 400C does not use the motion compensation and synchronization block 422 and the database 424. The functionality of other blocks such as the GNSS-based timing source 402, the tuner 404, the baseband converter 406, the receive antenna 408, LNA 410, the ADC 414, the formatter 416, the data buffer 418, the data rate controller 426, the transport layer data encapsulation block 428, and the network 110 are the same as discussed above with respect to FIG. 4A. In the satellite receiver 400C, the functionality to perform motion compensation and synchronization is deferred to the subsequent combining stage (e.g., a combining processor such as 106 of FIG. 1).

In some aspects, the satellite receivers 400A and 400C are capable of performing detection of satellite specific synchronization and training signals to assess signal quality. The signal quality can be used to ascertain usefulness of received data for completing communications link, which is reported as quality metrics to the network controller 120. The satellite receivers 400A and 400C may buffer the digitized RF data on local storage (e.g., data buffer 418), and may stream the data using the rate controller (e.g., 426) to meet backhaul communication bandwidth constraints. Additionally, the satellite receivers 400A and 400C may survey the local area for interference and report health and status to the network controller 120. The satellite receiver 400A and 400C have the ability to determine their own location (e.g. GPS) and have stable and precise timing source (e.g. from internal or external GPS). The digital data generated by the satellite receivers 400A and 400C is in a format compatible with standard internet protocols (e.g., TCP).

In some aspects, receiver sites (e.g., 104 of FIG. 1) can leverage existing infrastructure (e.g. mobile telecommunication antenna towers) that already have the necessary power, equipment bays, antenna mounting structures, and redundant broadband connectivity. These potential sites may have the right spatial diversity and scale to accommodate the system.

In one or more aspects, the receiver (e.g., 104) is designed to operate on one radio frame at a time, but employs the synch channel spanning a time period larger than the radio frame. This enables frequency correction of the radio frame with accuracy sufficient for demodulation.

Figure 5A:
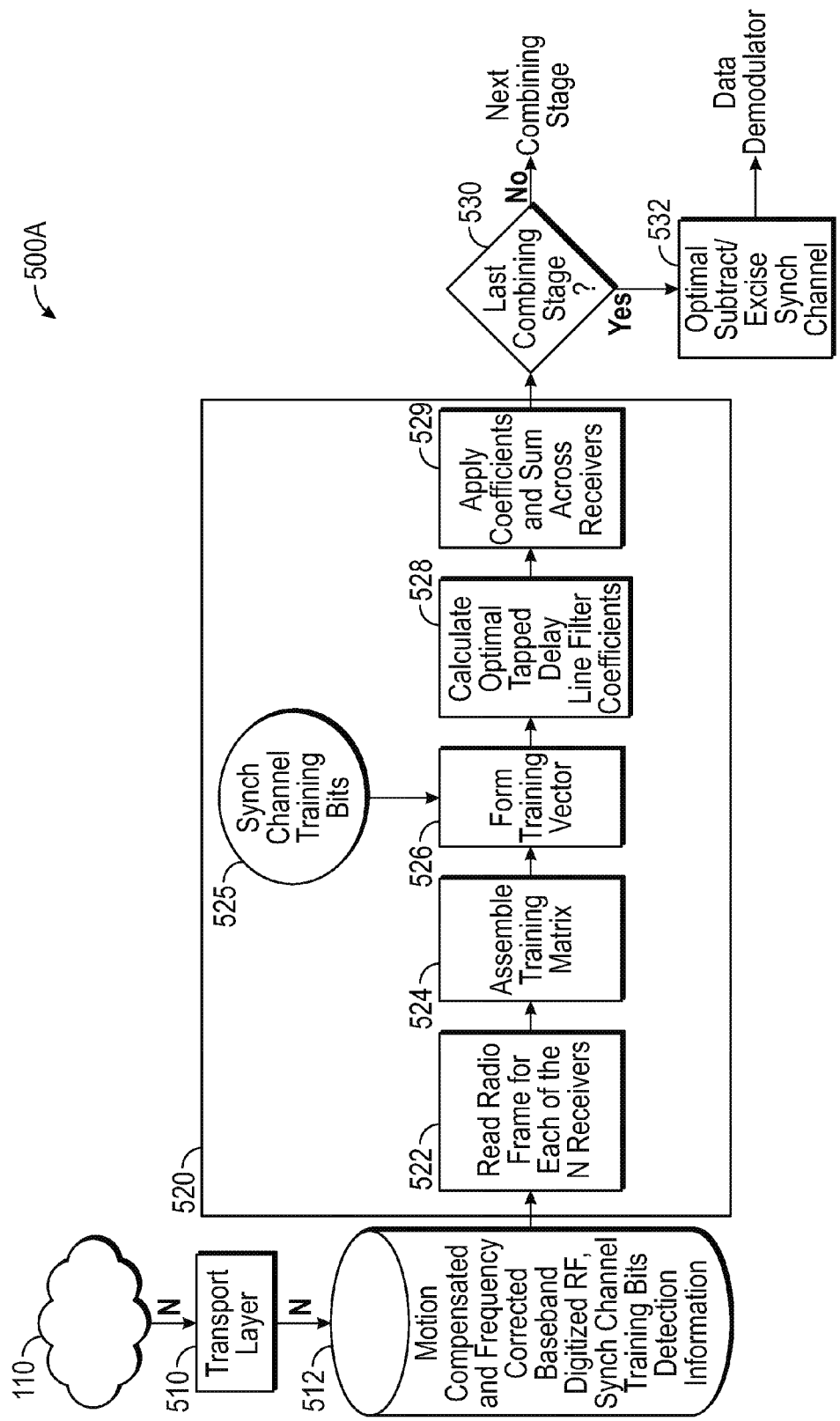
FIGS. 5A-5B are block diagrams illustrating example system architectures for a combining processor, according to certain aspects of the disclosure.
Figure 5B:
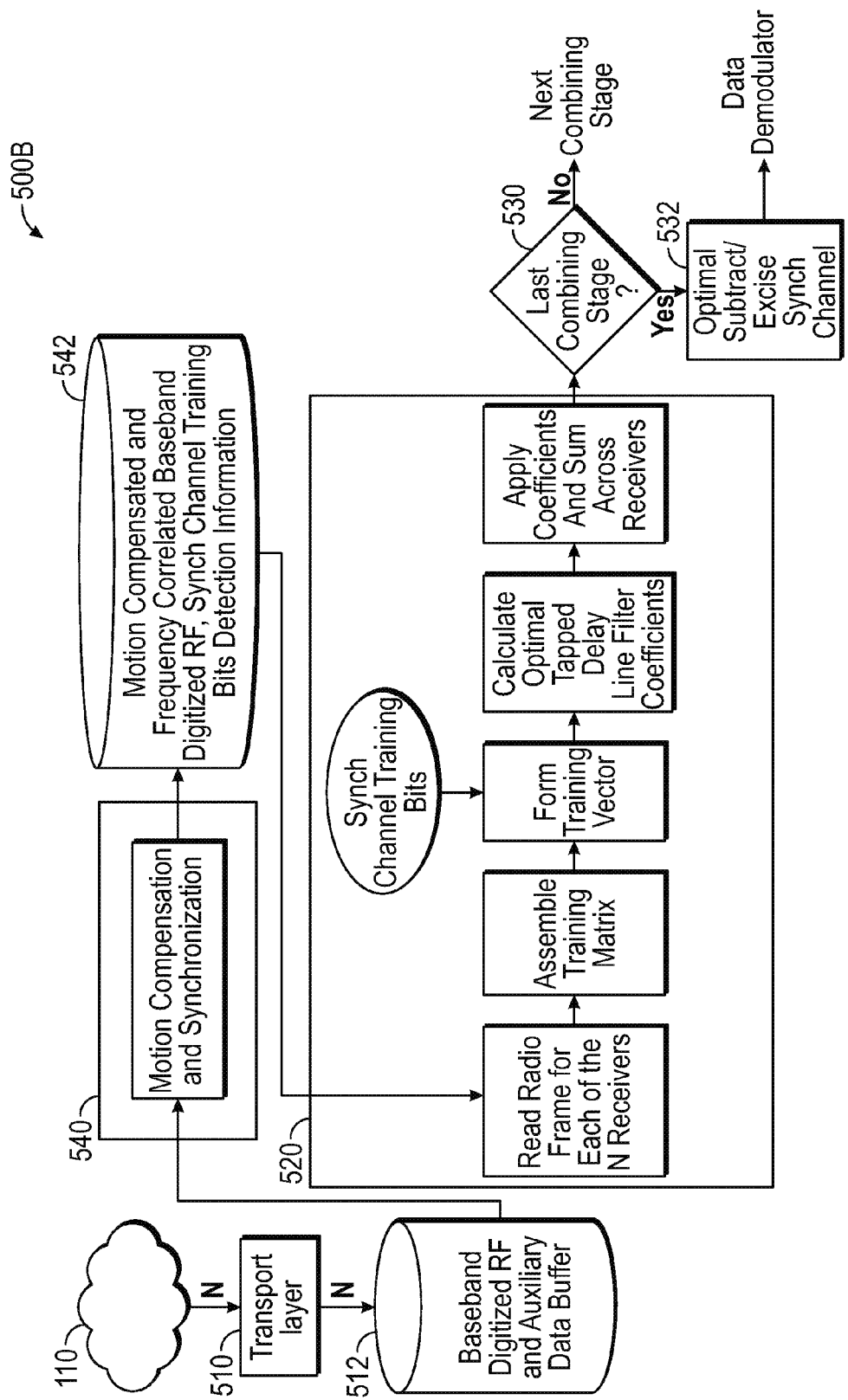

FIGS. 5A-5B are block diagrams illustrating example system architectures for combining processors 500A and 500B, according to certain aspects of the disclosure. The combining processors 500A and 500B are example implementation of the combining processor 106 of FIG. 1. The combining processors 500A and 500B can accept digitized signal from a plurality of receivers (e.g., 104 of FIG. 1, 400A of FIG. 4A, or 400C of FIG. 4C) and produce a single digital output. The combining processors 500A and 500B can performs some or all of the operations necessary to coherently combine the plurality of digital inputs required to achieve an increase in the signal-to-noise of the targeted communications signal transmitted by the Satellite (e.g., 102 of FIG. 1). The combining processor 500A corresponds to the satellite receiver 400A and receives motion compensated and synchronized digital signals from multiple receivers, derives optimal tapped delay line filter coefficients for each data stream, and combines them through the principle of superposition.

In some aspects, the combining processor 500A includes a transport layer block 510, a data buffer 512, a summation processor 520, a control block 530, and an optional block 532. The summation processor 520 is specific to an individual radio frame and is repeated for all radio frames. The transport layer block 510 is a known block that can receive from the network 110 and accept TCP formatted digital signals streamed by a receiver (e.g., 400A of FIG. 4A) and pass the received data to the data buffer 512. The data buffer 512 is similar to the database 424 of FIG. 4A and includes, for example, the motion compensated and frequency corrected baseband data and synch channel training bits detection information. To facilitate time alignment, frequency correction, and coherent combining, the RVG signal is partitioned into contiguous time segments called RVG radio frames aligned to the synch channel (e.g., 350 of FIG. 3).

As explained above regarding RVG radio frames, for the satellite transmitter 200A of FIG. 2A, the RVG radio frame is defined as one synch channel repetition period T2 of FIG. 3C. For the satellite transmitter 200B of FIG. 2B, the RVG radio frame is defined as a synch channel segment concatenated with a payload waveform segment 362 of FIG. 3C. The synch channel enables the use of efficient methods for obtaining the time and frequency synchronization needed to perform coherent combining of a large number of channels. The receiver is designed to operate on one radio frame at a time, but employs the synch channel spanning a time period larger than the radio frame. This enables frequency correction of the radio frame with accuracy sufficient for demodulation.

The functionalities of the summation processor 520 are performed in a number of stages 522, 524, 526, 528, and 529. In the stage 522, the radio frame for each of the N receivers coupled to the combining processor 500A through the network 110 are read. In the stage 534, a training matrix is assembled. In this stage, the fully corrected data is aligned with the synch channel waveform and arranged in the training matrix with each column corresponding to a receiver tapped delay line output. In some aspects, the number of rows of the training matrix corresponds to the number of samples in the synch channel and the number of columns of the training matrix is equal to the number of receivers times the number of tapped delay line taps per receiver.

In the stage 526, the synch channel training bits 525 are obtained from the network controller (e.g., 120 of FIG. 1) and used to form training vectors. The obtained synch channel training bits 525 are the same as those used in the target satellite transmitter. The training vector includes the synch channel waveform samples modulated in a manner identical to that used in the satellite transmitter, but sampled at the same sample rate as the fully corrected motion compensated data stream. At the stage 528, optimal tapped delay-line filter coefficients are determined. The optimal combining weights are calculated using the conventional least-squares formula such that the combined output resembles the training vector with the minimum sum of squared errors, as shown and described below with respect to FIG. 7. At the stage 529, the calculated weights are applied to perform summation across all receivers coupled to the combining processor 500A, of which the radio frames have been processed by the summation processor 520. At the control block 530 it is checked whether the combining processor 500A is the last combining processor. If the answer is no, the output of the summation processor 520 is streamed to the next combining processor. Otherwise, if the answer is yes, the output of the summation processor 520 is passed through the optional block 532, before being streamed to a data demodulator (e.g., 130 of FIG. 1).

The combining processor 500B of FIG. 5B corresponds to the satellite receivers similar to 400C of FIG. 4C, where the motion compensation and synchronization is not performed and is delayed to be implemented in the combining processor 500B. The combining processor 500B is similar to the combining processor 500A, except for addition of the motion compensation and synchronization block 540 and the database 542, which are structurally and functionally similar to the motion compensation and synchronization block 422 and the database 424 of the receiver 400A of FIG. 4A. The motion compensation and synchronization block 540 is coupled to the data buffer 512 and stores its output in the database 542, which is accessible to the summation processor 520, described above.

In some aspects, the combining processor 500A and/or 500B may perform detection of satellite specific synchronization and training signals on the combined signal output to assess signal quality to ascertain usefulness of the processed data to completing communications link and reports this to the network controller.

In one or more aspects, the combining processor 500A and/or 500B has a variable number of taps in the tapped delay line for each receiver which can be selected and specified by the NC node in accordance to environmental conditions, signal quality and processing performance. In some aspects, the combining processor 500A and/or 500B has the functionality to perform adaptive synchronization channel cancellation in the final combining operation. The adaptive synchronization channel cancellation can be exercised when the synch channel 310 of FIG. 3 is used.

Figure 6:
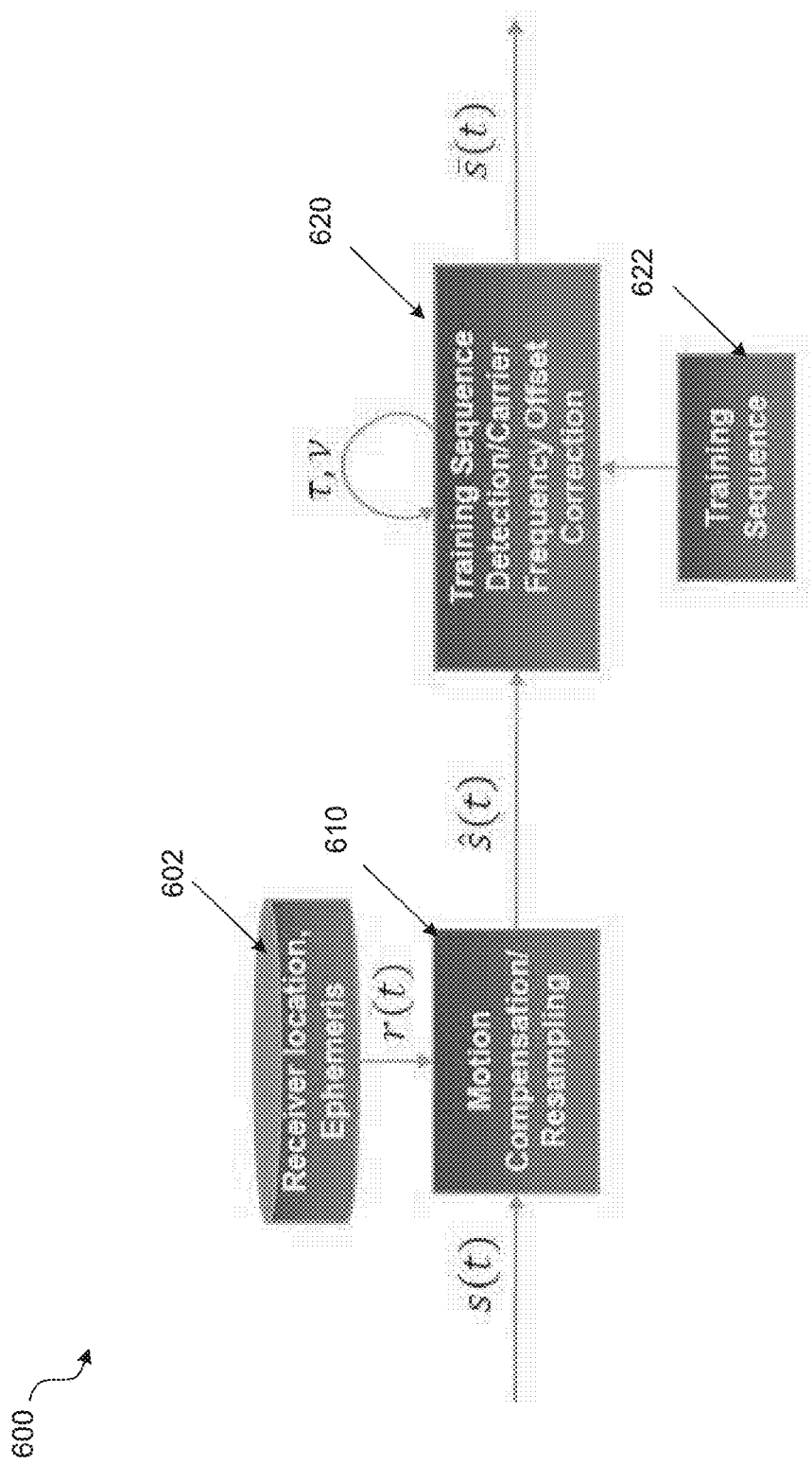
FIG. 6 is a functional diagram of an example RVG processing algorithm including channel synchronization, according to some aspects of the subject technology.

FIG. 6 is a functional diagram of an example RVG processing algorithm 600 including channel synchronization, according to some aspects of the subject technology. The RVG processing algorithm 600 is used to implement stages 432, 434, 436 and 438 of FIG. 4B. The RVG processing algorithm 600 starts with operation block 610, where a sample S(t) is motion compensated (e.g., 432 of FIG. 4B) using receiver location and satellite ephemeris 602. In some aspects, the time t is the satellite contact time with the ground receiver and is not computed with respect to a single physical location, but rather over a configurable, distribution of receivers (e.g., 104 of FIG. 1). The distance between a receiver and transmitting satellite at time t is denoted as r(t). The receiver location is derived as in 412 of FIG. 4C and the satellite ephemeris is derived as described in 108 of FIG. 1. The motion compensated sample, ŝ(t) can be expressed as: ŝ(t)=s(t+u(t)) exp(i2πf$_{rx}$u(t)), where the motion compensation delay u(t) is implicitly defined by $$u(t) = \frac{r(t + u(t))}{c},$$

r(t)/c is the propagation delay, c is the speed of light, f$_{rx}$ is the receiver local oscillator frequency, and s(t) is the received signal. At the operation block 620, training sequence 622 is detected and used to perform carrier frequency offset correction to generate a motion compensated and frequency corrected sample $\overline{S}$(t). Operation block 620 implements stages 434, 436 and 438 of FIG. 4B, where τ and ν represent delay and course frequency measurements respectfully. The fine frequency measurement (436 of FIG. 4B) is also measured within 620.

Figure 7:
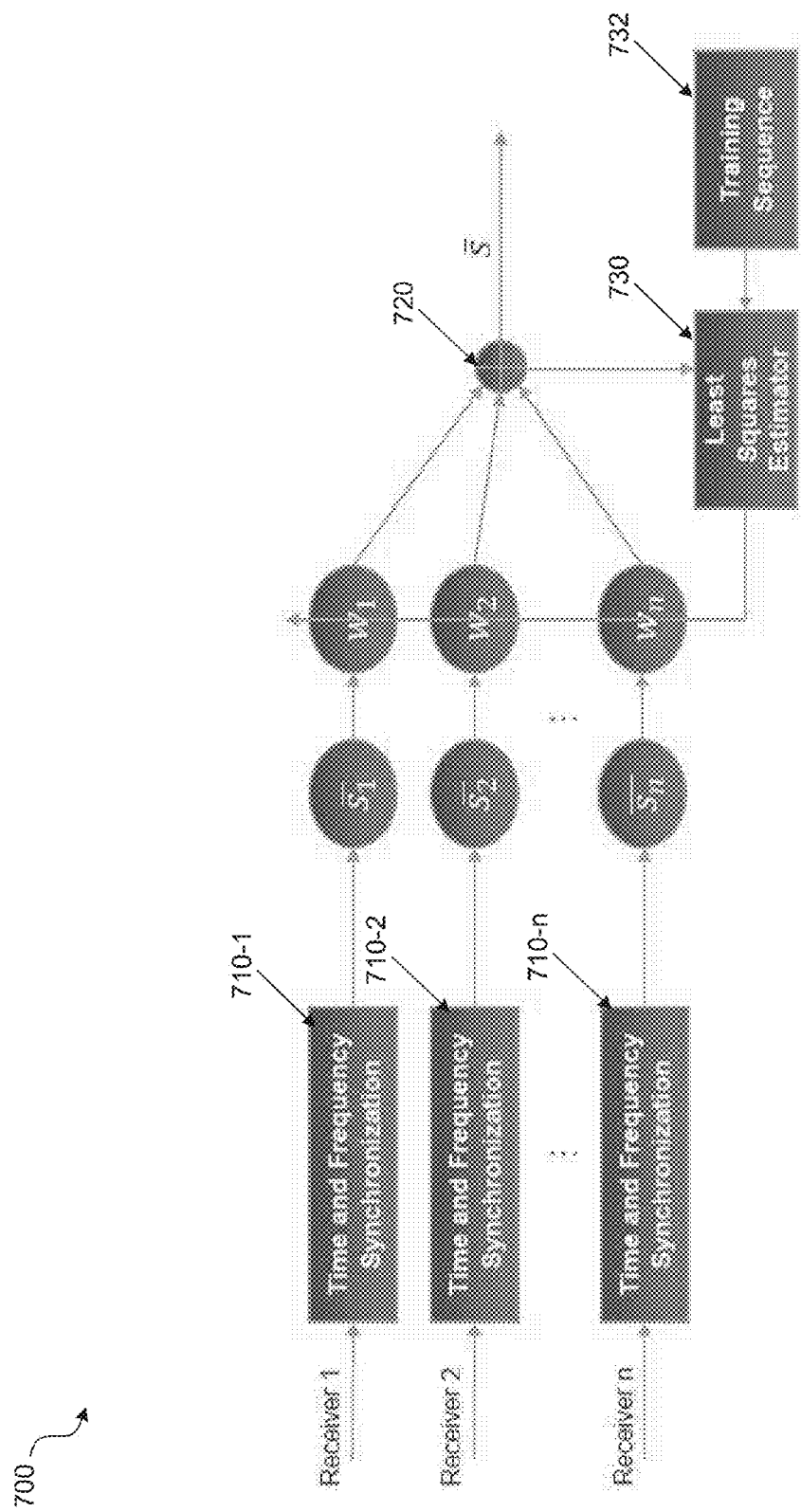
FIG. 7 is a functional diagram of an example RVG processing algorithm including channel combining, according to some aspects of the subject technology.

FIG. 7 is a functional diagram of an example RVG processing algorithm 700 including channel combining, according to some aspects of the subject technology. The RVG processing algorithm 700 calculates the optimal combining weights, using the least-squares formula. The optimal combining weights can be used to implement stage 528 of FIG. 5A, discussed above. According to the RVG processing algorithm 700, data (e.g., training vectors from 526 of FIG. 5A) associated with multiple receivers (e.g., receivers 1, 2 . . . n) are time and frequency synchronized (as explained above) in operation blocks 710-1, 710-2 . . . 710-n to generate signals $\overline{S}_1, \overline{S}_2 \ldots \overline{S}_n$. The signals $\overline{S}_1, \overline{S}_2, \ldots \overline{S}_n$ are summed in a summation block 720 using weights $W_1, W_2 \ldots W_n$, to generate a combined output $\overline{S}$. The weights $W_1, W_2, \ldots W_n$ are generated by the known least squares estimator 730, based on training sequence 732. The least squares estimator 730 determines the weights $W_1, W_2 \ldots W_n$ such that the combined output resembles the training sequence 732 with the minimum sum of squared errors.

Figure 8:
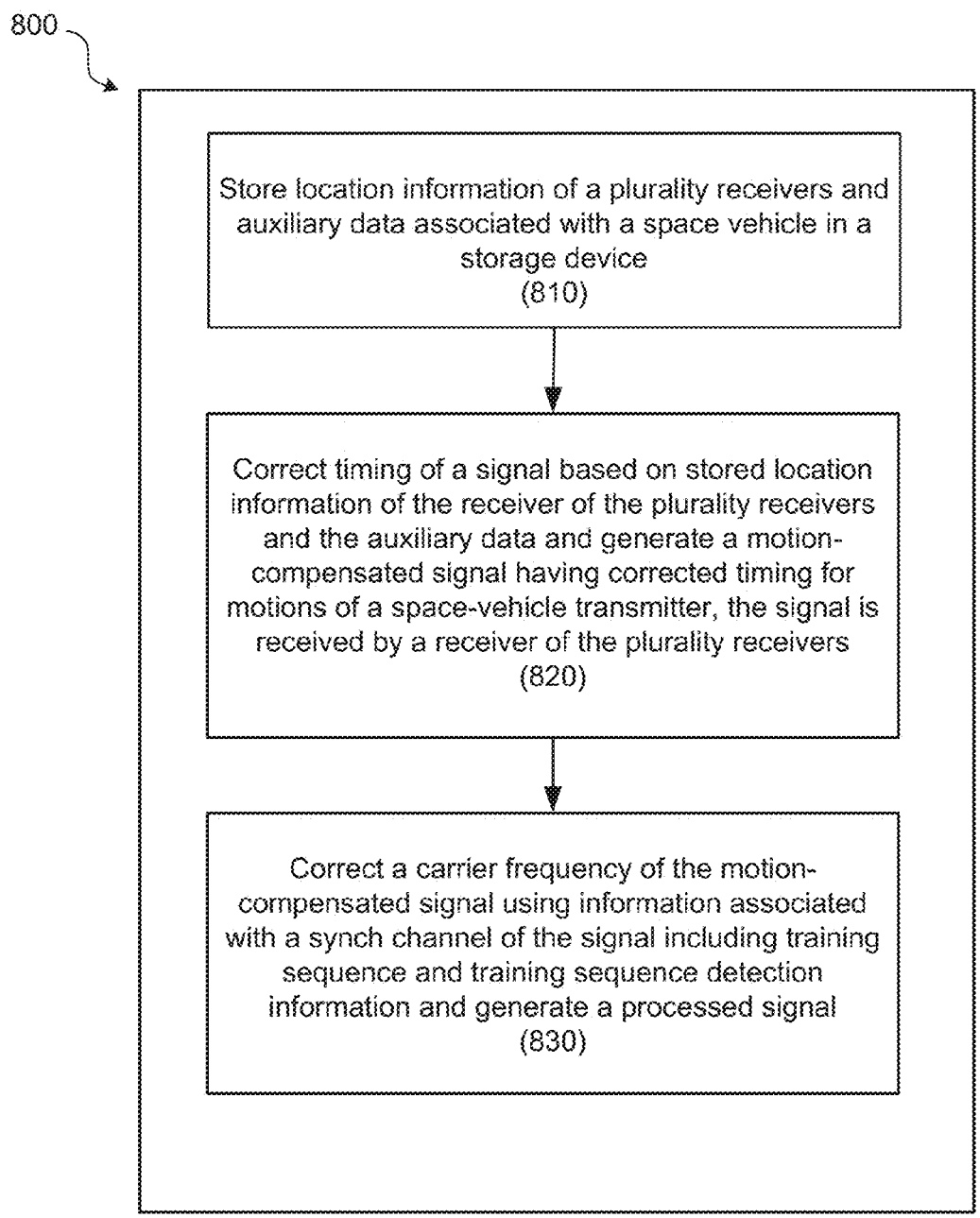
FIG. 8 is a flow diagram illustrating an example method of utilizing multiple spatially diverse receivers, according to some aspects of the subject technology.

FIG. 8 is a flow diagram illustrating an example method 800 of utilizing multiple spatially diverse receivers, according to some aspects of the subject technology. The method 800 includes storing location information of multiple receivers (e.g., 104 of FIG. 1, 400A of FIG. 4A, or 400C of FIG. 4C) and auxiliary data (e.g., 108 of FIG. 1) associated with a space vehicle (e.g., 102 of FIG. 1) in a storage device (e.g., 418 of FIG. 4A or 902 of FIG. 9) (810). Timing of a signal received by a receiver is corrected (e.g., by 406 of FIG. 4C) based on stored location information (e.g., 412 of FIG. 4A) of the receiver and the auxiliary data and generating a motion-compensated signal (e.g., output of 432 of FIG. 4B) having corrected timing for motions of a space-vehicle transmitter (e.g., 200A of FIG. 2A) (820). A carrier frequency of the motion-compensated signal is corrected (e.g., by 438 of FIG. 4B) using information associated with a synch channel (e.g., 350 of FIG. 3C) of the signal including training sequence (e.g., 352 of FIG. 3C) and training sequence detection information and generating a processed signal (e.g., 440 of FI G. 4B) (830).

Figure 9:
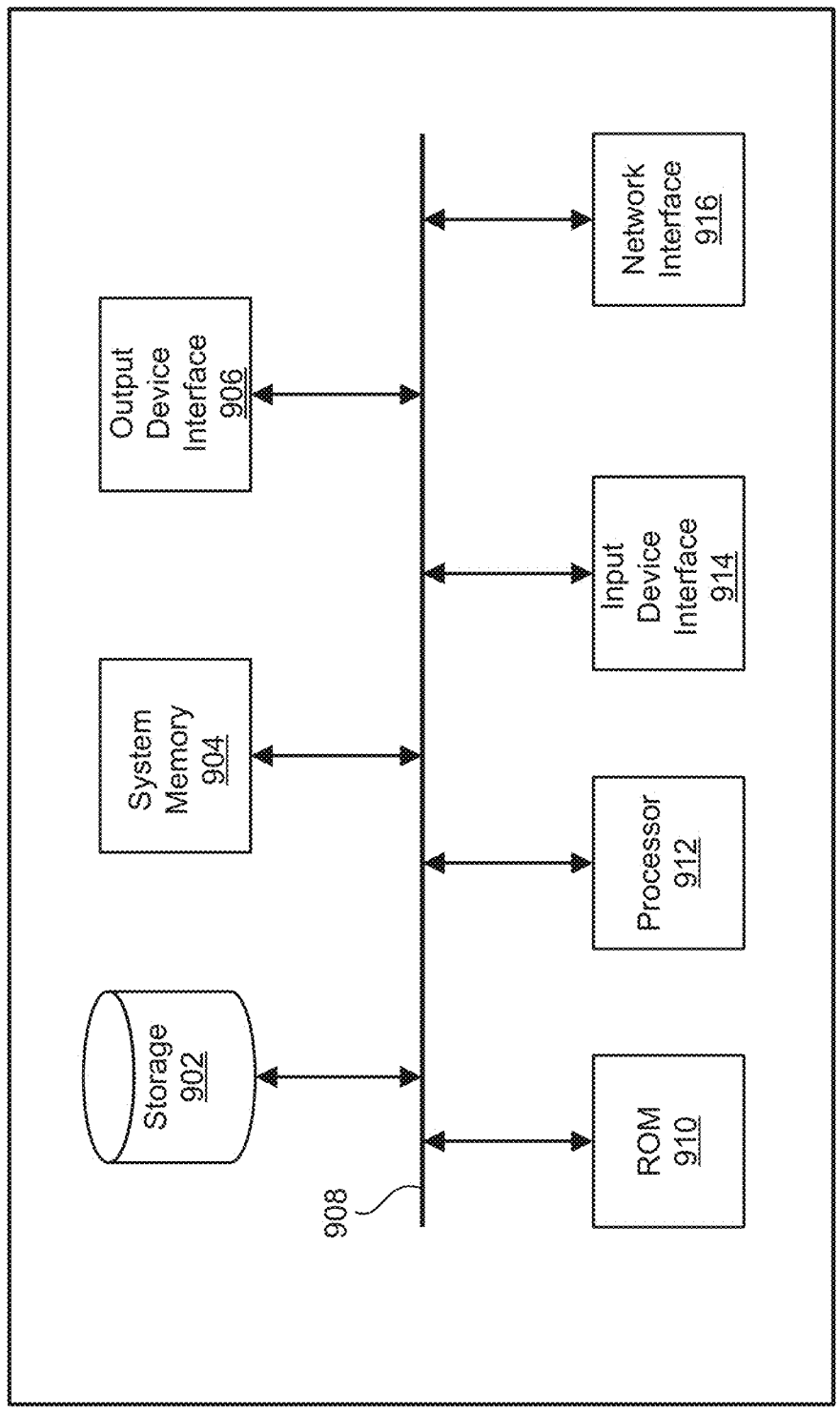
FIG. 9 is a block diagram conceptually illustrating an electronic system 900 with which aspects of the subject technology are implemented.

FIG. 9 is a block diagram conceptually illustrating an electronic system 900 with which aspects of the subject technology are implemented. Electronic system 900, for example, can be a desktop computer, a laptop computer, a tablet computer, a server, a switch, a router, a base station, a receiver, a phone, a personal digital assistant (PDA), or generally any electronic device that has processing power and memory and communication capability. Such an electronic system may include various types of computer readable media and interfaces for various other types of computer readable media. Electronic system 900 includes bus 908, processing unit(s) 912, system memory 904, read-only memory (ROM) 910, permanent storage device 902, input device interface 914, output device interface 906, and network interface 916, or subsets and variations thereof.

Bus 908 collectively represents all system, peripheral, and chipset buses that communicatively connect the numerous internal devices of electronic system 900. In one or more implementations, bus 908 communicatively connects processing unit(s) 912 with ROM 910, system memory 904, and permanent storage device 902. From these various memory units, processing unit(s) 912 retrieves instructions to execute and data to process in order to execute the processes of the subject disclosure. The processing unit(s) 912 can be a single processor or a multi-core processor in different implementations. In some aspects, the processing unit(s) 912 may perform the functionality of the processors of the subject technology, for example, the summation processor 520 of FIG. 5A. In some aspects, the processing unit(s) 912 may be used to implement various algorithms and methods disclosed herein, for example, method and algorithms of FIGS. 4b, 6 and 7.

ROM 910 stores static data and instructions that are needed by processing unit(s) 912 and other modules of the electronic system. Permanent storage device 902, on the other hand, is a read-and-write memory device. This device is a non-volatile memory unit that stores instructions and data even when electronic system 900 is off. One or more implementations of the subject disclosure use a mass-storage device (such as a magnetic or optical disk and its corresponding disk drive) as permanent storage device 902.

Other implementations use a removable storage device (such as a floppy disk, flash drive, and its corresponding disk drive) as permanent storage device 902. Like permanent storage device 902, system memory 904 is a read-and-write memory device. However, unlike storage device 902, system memory 904 is a volatile read-and-write memory, such as random access memory. System memory 904 stores any of the instructions and data that processing unit(s) 912 needs at runtime. In one or more implementations, the processes of the subject disclosure are stored in system memory 904, permanent storage device 902, and/or ROM 910. From these various memory units, processing unit(s) 912 retrieves instructions to execute and data to process in order to execute the processes of one or more implementations.

Bus 908 also connects to input and output device interfaces 914 and 906. Input device interface 914 enables a user to communicate information and select commands to the electronic system. Input devices used with input device interface 914 include, for example, alphanumeric keyboards and pointing devices (also called "cursor control devices"). Output device interface 906 enables, for example, the display of images generated by electronic system 900. Output devices used with output device interface 906 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, bus 908 also couples electronic system 900 to a network (not shown) through network interface 916. In this manner, the computer can be a part of a network of computers (such as a local area network ("LAN"), a wide area network ("WAN"), or an Intranet, or a network of networks, such as the Internet. Any or all components of electronic system 900 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

In some aspects, using the subject technology, carrier-to-interference and carrier-to-noise can be driven down to levels that would not interfere with existing geostationary satellite orbit (GSO) receive earth stations, thereby opening up new spectrum for mission data downlink.

In one or more aspects the disclosed solution is compatible with existing modulation techniques. For example, the disclosed solution utilizes pilot features such as known data markers or sequences in the transmitted waveform to determine relative phase offsets between the spatially diverse receivers and enable coherent integration of the N receivers and the M sub-bands. The disclosed solution includes a number of advantageous features. For example, the disclosed solution benefits from inherent resilient properties, flexibility to address different mission needs, and scalability. The receivers of the subject technology receive the transmission band in relatively narrow instantaneous bandwidths and then combines them to reconstruct the complete transmission band. This allows for significantly less expensive receiver technology to be utilized at each ground node. The disclosed solution works with existing modulation techniques and can enable higher order modulation techniques to be used. The subject technology can be employed in a number of applications including, but not limited to, remotely sensed data at low earth orbit (LEO) and assured timely communications along a space-to-ground path. The disclosed system can be viewed as a ubiquitous ground interface for communications with many space vehicles.

In some aspects, RVG inherently supports multiple access by exploiting differences in relative motion between receivers and satellites i.e. RVG can support demodulation of transmitted data from many satellites (e.g., 102 of FIG. 1) transmitting simultaneously within the same RF band/channel to a common set of receivers (e.g., 104 of FIG. 1).

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. An apparatus comprising:
a storage device configured to store location information of a plurality receivers and auxiliary data associated with a space vehicle;
a motion compensation block configured to correct timing of a received signal by a receiver of the plurality receivers from a space-vehicle transmitter and to generate a motion-compensated signal having corrected timing for motions of the space-vehicle transmitter, the corrected timing being determined based on stored location information of the receiver of the plurality receivers and the auxiliary data; and
a frequency correction block configured to correct a carrier frequency of the motion-compensated signal using information associated with a synch channel of the received signal and to generate a processed signal.

2. The apparatus of claim 1, wherein the apparatus is implemented using hardware and firmware included in each of the plurality of receivers, and wherein the plurality of receivers comprise a plurality of ground receivers.

3. The apparatus of claim 2, wherein each of the plurality of receivers is configured to communicate the processed signal to a combining processor.

4. The apparatus of claim 3, wherein the combining processor comprises a summation processor including a tapped delay-line filter and is configured to:
receive resilient virtual ground (RVG) radio frames associated with processed signals of the plurality of the receivers;
form training vectors using a training sequence of the synch channel of the received signal;
calculate optimal coefficients associated with the tapped delay-line filter; and
configure the tapped delay-line filter to perform summation of the processed signals of the plurality of the receivers using the optimal coefficients.

5. The apparatus of claim 3, wherein the apparatus is part of the combining processor, and wherein the combining processor is configured to communicate with the plurality of receivers over a network, wherein the network includes the Internet.

6. The apparatus of claim 1, wherein the information associated with the synch channel of the received signal comprises a training sequence and training sequence detection information.

7. The apparatus of claim 1, wherein the auxiliary data comprises orbit parameters, synchronization, and training signal characteristics assigned to the space vehicle.

8. The apparatus of claim 1, wherein the motion compensation block is configured to correct timing of the received signal by reversing a time-variable delay and a phase effect due to propagation delay between the space vehicle and the receiver of the plurality of receivers.

9. The apparatus of claim 8, wherein the motion compensation block is configured to reverse the time-variable delay and the phase effect by removing a dilation, a contraction, and Doppler effects to enable coherent combining of signals received from widely-spaced receivers.

10. The apparatus of claim 1, wherein the frequency correction block is configured to correct the carrier frequency of the motion-compensated signal by removing a carrier frequency offset of time-aligned motion compensated data accumulated over a corresponding synch channel repetition period.

11. A method comprising:
storing location information of a plurality receivers and auxiliary data associated with a space vehicle in a storage device;
correcting timing of a signal based on stored location information of the receiver of the plurality receivers and the auxiliary data and generating a motion-compensated signal having corrected timing for motions of a space-vehicle transmitter, wherein the signal is received by a receiver of the plurality receivers; and
correcting a carrier frequency of the motion-compensated signal using information associated with a synch channel of the signal including training sequence and training sequence detection information and generating a processed signal.

12. The method of claim 11, further comprising coherently combing, using a summation processor and a tapped delay-line filter, processed signals of the plurality of the receivers.

13. The method of claim 12, wherein coherently combing comprises:
receiving resilient virtual ground (RVG) radio frames associated with processed signals of the plurality of the receivers;
forming training vectors using a training sequence of the synch channel of the received signal;
calculating optimal coefficients associated with the tapped delay-line filter; and
performing summation of the processed signals of the plurality of the receivers using the tapped delay-line filter and the optimal coefficients.

14. The method of claim 11, wherein the information associated with the synch channel of the received signal comprises a training sequence and training sequence detection information.

15. The method of claim 11, wherein the auxiliary data comprises orbit parameters, synchronization, and training signal characteristics assigned to the space vehicle.

16. The method of claim 11, wherein correcting timing of the received signal comprises reversing a time-variable delay and a phase effect due to propagation delay between the space vehicle and the receiver of the plurality of receivers.

17. The method of claim 16, wherein reversing the time-variable delay and the phase effect comprises removing a dilation, a contraction, and Doppler effects to enable coherent combining of signals received from widely-spaced receivers.

18. The method of claim 11, wherein correcting the carrier frequency of the motion-compensated signal comprises removing a carrier frequency offset of time-aligned motion compensated data accumulated over a corresponding synch channel repetition period.

19. A satellite communication system, comprising:
a satellite transmitter configured to accumulate terrestrial data;

a plurality of receivers, each receiver configured to receive a raw data from the satellite transmitter and organize the raw data, the raw data including the accumulated terrestrial data;

one or more combiner nodes in communication with the plurality of receivers over a network;

a network controller configured to coordinate operation of the satellite transmitter and the the plurality of receivers;

a storage device configured to store location information of the plurality receivers and auxiliary data associated with the satellite transmitter;

a motion compensation unit configured to correct timing of the organized raw data and to generate motion-compensated signal having corrected timing for motions of the satellite transmitter, the corrected timing being determined based on stored location information of the receiver of the plurality receivers and the auxiliary data; and a frequency correction unit configured to correct a carrier frequency of the motion-compensated signal using information associated with a synch channel of the received signal and to generate a processed signal.

20. The satellite communication system of claim 19, wherein the motion compensation unit is configured to reverse a time-variable delay and a phase effect by removing a dilation, a contraction, and Doppler effects to enable coherent combining of signals received from widely-spaced receivers, and wherein correcting the carrier frequency of the motion-compensated signal comprises removing a carrier frequency offset of time-aligned motion compensated data accumulated over a corresponding synch channel repetition period.

* * * * *